Feb. 2, 1960     P. STELLA DI GIULIO     2,923,478
APPARATUS FOR AUTOMATICALLY CONTROLLING THE TEMPERATURE OF LIQUIDS
Filed Aug. 19, 1958     3 Sheets-Sheet 3

United States Patent Office 2,923,478
Patented Feb. 2, 1960

2,923,478

APPARATUS FOR AUTOMATICALLY CONTROLLING THE TEMPERATURE OF LIQUIDS

Pietro Stella di Giulio, Novara, Italy

Application August 19, 1958, Serial No. 755,990

Claims priority, application Switzerland October 4, 1957

3 Claims. (Cl. 236—12)

This invention relates to an apparatus for automatically controlling the temperature of the mixture of two liquids at different temperatures and pressures, of the type comprising a liquid expansion thermostat and a valve operated by the thermostat adapted to simultaneously control the supply conduits for both liquids.

The improved temperature controlling apparatus has the main characteristic feature that the thermostat enclosed by a cylindrical chamber in which the two liquids are mixed, is provided with two head portions directly acting without any interposed resilient member on the valve and an adjusting member, respectively, serving to predetermine and read the temperature of the mixture by means of a pointer movable over a graduated dial.

The invention shall be described with reference to the accompanying drawings which show by way of a non limiting example an embodiment thereof.

Figs. 3–6 are sectional views on line III—III, IV—IV, V—V, VI—VI, respectively, of Figure 1.

Figure 1:
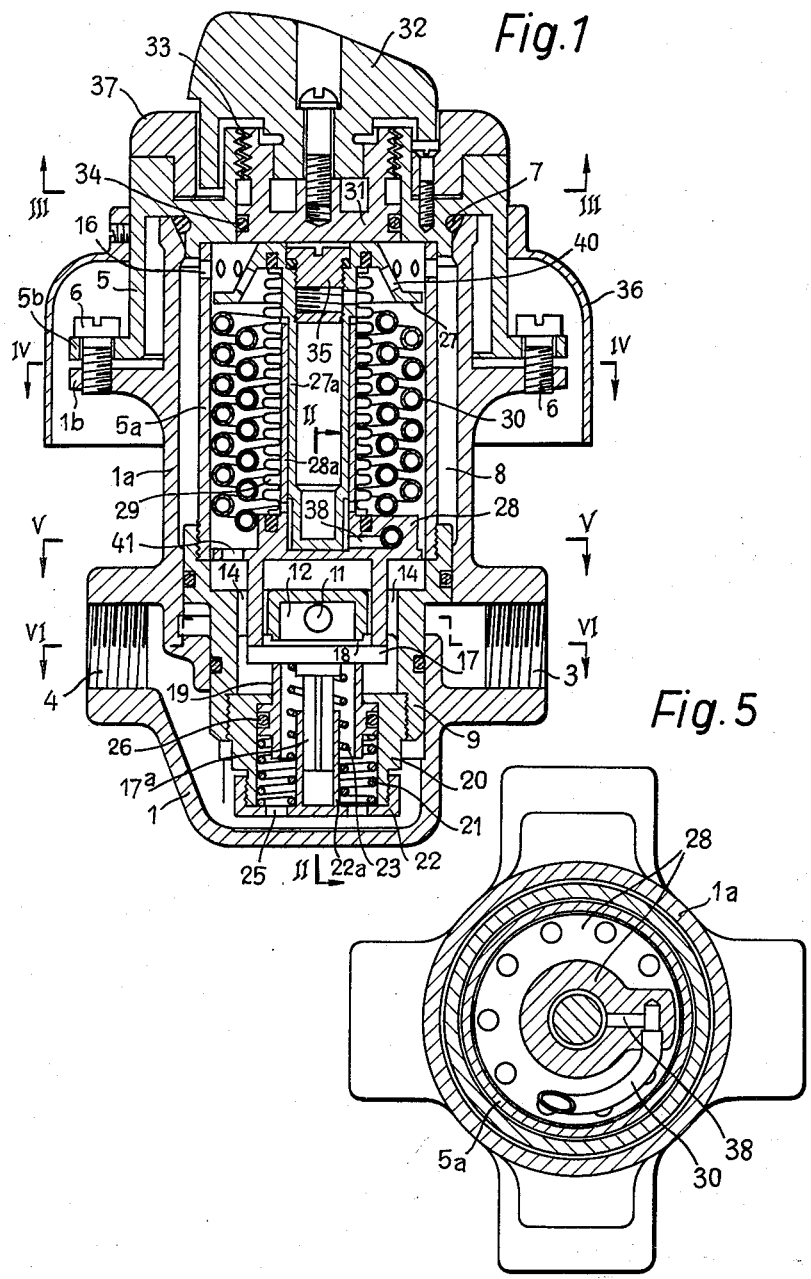
Fig. 1 is an axial sectional view of the apparatus.
Figure 2:
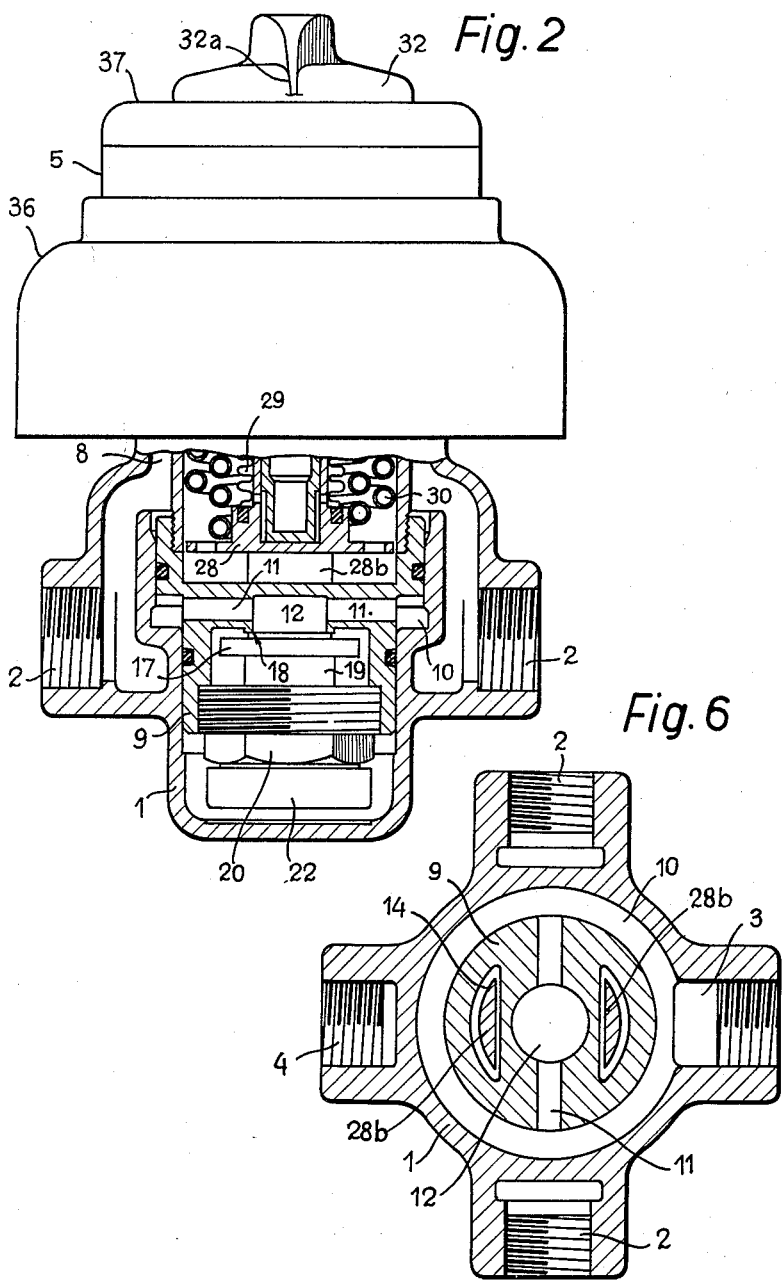
Fig. 2 is a side view and part sectional view on line II—II of Fig. 1.
Figure 3:
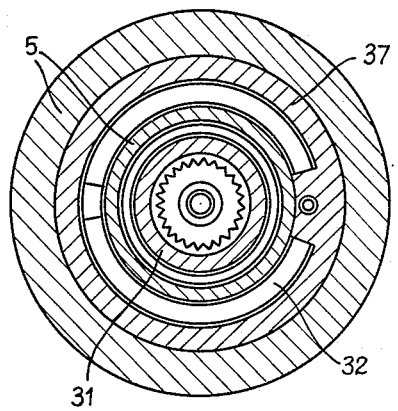
Figure 4:
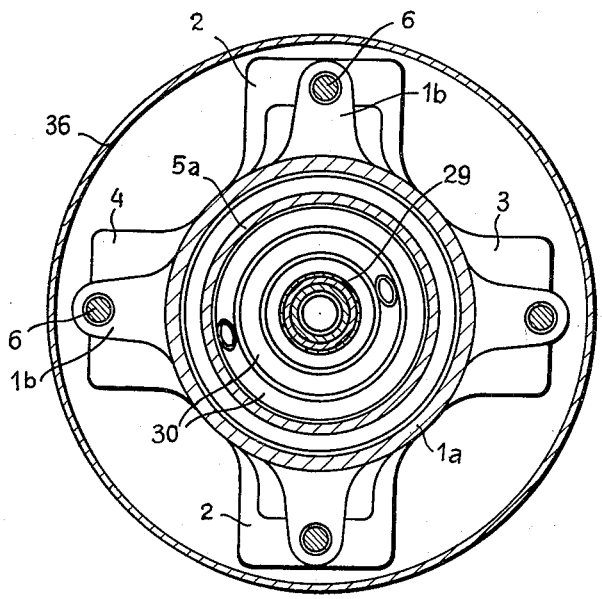

The apparatus comprises a lower body 1 having bored therein two diametrically opposed conduits 2 delivering the mixture, and further two diametrically opposed conduits 3, 4 orthogonal to the former for supplying the cold and hot liquid, respectively.

The casing 1 is formed with a top tubular extension 1a having extending therefrom four flaps 1b radially directed outwardly for attachment by means of screws 6 to the top casing 5 of the apparatus which is formed with a tubular extension 5a received by the tubular portion 1a and radial extensions 5b engaging the above mentioned attachment screws 6.

The two casings are tightly sealed against each other by an annular packing 7.

A gap 8 between the tubular portions 1a and 5a of both casings connects at one end with the mixture delivery conduits 2 and at its other end through radial bores 16 in the tubular extension with the mixing chamber confined within the said extension.

The extension 5a has screwed to its lower end a cylindrical block 9 sealing by means of annular packings against corresponding internal cylindrical seatings in the lower body 1.

An annular chamber 10 is provided between the block 9 and body 1 and connects at one end with the cold liquid supply conduit 3 (Fig. 6) and at its other end with the mixing chamber through radial holes 11, a central chamber 12 and a pair of vertical slits 14 in the block 9.

A disc valve 17 is enclosed by the block 9 and is formed with the lower extension 17a capable of telescopic displacement within a corresponding cylindrical extension 22a on the lower plug 22. The valve 17 cooperates with two seats, namely a stationary top seat formed by an annular edge 18 around the chamber 12 in block 9 and a lower seat formed by the annular edge on a tubular member 19 enclosed by a sleeve 20 screwed to the bottom of the block 9. The lower valve seat 19 is capable of axial displacement within the sleeve 20 against the action of a spring 21 bearing at its lower end on the plug 22 screwed to the bottom of the sleeve 20. A spring 23 bears on the plug 22, the spring 23 being arranged coaxially with the spring 21 and acting on the valve 17. The plug 22 has holes 25 bored therethrough for the flow of hot liquid from the conduit 4 towards the mixing chamber when the valve 17 is lifted from its lower seat 19.

The lower valve seat 19 and supporting sleeve 20 are sealed against each other by an annular packing 26.

The thermostat in the mixing chamber comprises a top head portion 27 and a lower head portion 28 substantially of disc shape, formed with corresponding cylindrical extensions 27a, 28a capable of telescopic displacement within each other and adapted to keep axial expansion of the thermostat rectilinear. The said cylindrical extensions have arranged around them a flexible bellows 29 of corrugated sheet metal and a helical coil 30, one end of which is attached to the lower head portion 28 and connects with the inside of the bellows 29 through a hole 38.

A liquid adapted to expand by the action of heat is filled into the bellows and coil, the said liquid being fed and tightly enclosed by a hole bored in the middle of the head portion 27 and closed by a screw plug 35.

The lower head portion 28 and top head portion 27 have holes 41, 40 bored therethrough for the flow of liquid towards the delivery conduits, the lower head portion 28 being moreover provided with a pair of lower wings 28b extending through slits 14 in the block 9 and resting on the valve 17 in order to control displacement thereof by effect of expansion of the thermostat on variation of the temperature of the mixture within the mixing chamber.

The top head portion 27 bears on a cylindrical member 31 attached to an operating key 32 and engaging through a helical coupling 33 a corresponding seat in the top casing 5. A rotation of the key by effect of the said helical coupling axially displaces the cylindrical member 31, hence the whole thermostat unit by acting through the lower wings 28b on the valve 17.

The cylindrical member 31 is provided with an annular seal packing 34 interposed between the mixing chamber and helical seat 33.

The lower casing 1 is adapted to be incorporated by the wall or structure supporting the temperature control apparatus in which it is hidden from view, the outer portion of the casing 5 being enclosed by a casing 36 concealing the attachment screws 6.

A ring 37 is arranged around the adjusting key 32 for the thermostat and is frontally provided with a graduation not visible on the drawing cooperating with a pointer 32a on the key.

The apparatus operates as follows:

On upward displacement of th valve 17, the valve closes the top seat 18 preventing cold liquid flow from the supply conduits 3 towards the mixing chamber and delivery conduits 2, the flow of hot liquid being then possible from the supply conduit 4 through holes 25 and the lower seat 19 for the valve to the mixing chamber, thence to the delivery conduit 2.

On downward displacement of the valve 17 the lower valve seat 19 closes, thereby intercepting the hot liquid flow, the top seat 18 being opened and allowing cold liquid flow from the supply conduit 3 to the delivery conduits 2 through the annular chamber 10, radial holes 11, central chamber 12, slits 14 and mixing chamber.

In intermediate positions of the valve 17 hot and cold liquid flow simultaneously in proportions corresponding to the valve position which, as mentioned above, is previously set as desired by rotating the adjusting key 32 and is maintained in its proper position for supply of the mixed liquid at a predetermined temperature through the automatic action of the thermostat independently of variations in temperature and pressure of the two liquids.

The head portions 27, 28 of the thermostat, having holes bored therethrough for the flow of liquid to the mixing chamber, perform the double function of centering and guiding the thermostat and improving a thorough mixture of the liquid streams to be mixed.

The provision of the annular seal packing 34 interposed between the top of the mixing chamber and helical seat 33 in the adjusting key seals the said helical seat against contact with the liquid, thereby making possible lubrication of the said seat while avoiding calcareous deposits and excessive play arising between the screw and nut, thereby improving the life of the component parts.

By unscrewing the screws 6 it is possible to fully remove together with the casing 5 the internal components of the apparatus for inspection and upkeep purposes.

The expansible liquid is filled into the thermostat quickly and safely through the plug 35 which is provided with a packing for the purpose of a tight seal.

The lower valve seat 19 is resiliently yieldable to afford additional downward displacements of the valve 17, as a safety against objectionable overpressures as might be set up within the thermostat when the latter tending to expand beyond its position closing the seat 19 and giving access to the hot liquid should be uncapable of further expansion owing to leakage of the valve 17 on the said seat or other reasons. In this case the spring 21 is compressed and returns the lower valve seat 19 to its normal position as the cause giving rise to the additional downward displacement of the valve 17 ceases.

What I claim is:

1. Apparatus for determining and automatically controlling the temperature of a mixture of two liquids at different temperatures and pressures, comprising a cylindrical main body open at one end having bored therein near its other end two pairs of diametrically opposed conduits, the conduits of one pair being designed to be connected to ducts supplying to the apparatus cold and hot liquid, respectively, the conduits of the other pair being designed to be connected to ducts delivering liquid from the apparatus, a top casing closing said body, means for connecting said top casing to said body, a tubular extension for said top casing projecting within said body laterally spaced therefrom, thereby defining an annular gap, said gap communicating with the conduits of said other pair, a first inner cylindrical seating in said body situated above the conduits of said pairs, said seating being of a diameter larger than said extension on the top casing, a second inner cylindrical seating in said body situated in front of said conduits of a diameter smaller than said extension on said top casing, a cylindrical block secured to the lower end of said extension, said block having an upper cup-shaped part sealed against said first cylindrical seating and of an inner diameter equalling the inner diameter of said tubular extension, a lower cup-shaped part extending through said second inner cylindrical seating sealed against the latter and projecting therefrom upwardly and downwardly, whereby an annular chamber is formed, said chamber being connected with the conduit designed to be connected to a duct supplying cold water, and a disc-shaped thick wall separating said upper and lower cup-shaped parts, said disc-shaped wall having provided therein a cylindrical recess communicating with said lower cup-shaped portion, a radial bore connecting said recess with said annular chamber and a pair of lateral through openings symmetrically arranged with respect to said recess and finally an annular edge projecting from said wall and surrounding said recess, a sleeve having an annular inner flange screwed into said lower cup-shaped part and spaced from said disc-shaped wall, thereby defining therebetween a substantially cylindrical chamber, a tubular member slidable in said sleeve, sealed against it and projecting therefrom towards said disc-shaped wall, the inner diameter of said tubular member being equal to the inner diameter of said edge and said recess in the disc-shaped wall, an annular external flange on the portion of said tubular member arranged within said sleeve for defining the uppermost position of said member with respect to said sleeve, a plug closing the lower end of said sleeve, said plug having holes therein connecting the inside of the sleeve with the inner hollow of said body near the bottom of the latter, said inner hollow communicating with said conduit designed to be connected to the duct supplying the hot liquid, a tubular guide at the center of said plug projecting within said sleeve and said tubular member a disc-shaped valve arranged between said annular edge and the upper end of said tubular member in said cylindrical chamber, a stem for said valve slidable in said tubular guide fast with said plug, a first spring interposed between said valve and said pulg for constantly urging the valve against said annular edge and intercept the flow of cold water towards said cylindrical chamber, a second spring interposed between said tubular member and said plug to allow yielding of the latter as the valve bears on the upper end of said member and thereby intercepts the flow of hot water towards said cylindrical chamber, a lower head of disc-shape slidable within said tubular extension on the top casing closing the body of the apparatus, a pair of lower extensions on said head projecting through said lateral openings provided in said disc-shaped wall and bearing upon the valve side facing said annular edge, said extensions being of a length such that said head portion is spaced from said disc-shaped wall even when the valve bears on the upper end of said tubular member, a cylindrical member axially slidable in a central bore in said top casing closing the body of the apparatus and coupled thereto by a helical coupling, an operating key fast with said cylindrical member and projecting outwardly from said top casing for rotating said cylindrical member and displacing it axially of the body, a push member within said tubular extension on said top casing freely interposed between said cylindrical member and said lower head portion for adjusting the position of said valve, a device responsive to the temperature within the said tubular extension on the top casing for correcting the position of the valve and, consequently the temperature of the liquid delivered by the apparatus, and means for connecting the inside of said tubular extension with said annular gap and said lateral through openings provided in said disc-shaped wall of said cylindrical block secured to the lower end of said tubular extension on said top casing, closing the main body of the apparatus.

2. Apparatus as set forth in claim 1, wherein said push member freely interposed between said cylindrical member fast with said key and said lower head portion comprises a hollow rod closed at its lower end by a bottom wall and at its upper end by a plug and carrying at its upper end a flange having a trunco-conical portion and a peripheral radial portion of an outer diameter substantially equalling the inner diameter of said tubular extension on said top casing, thereby being axially slidable in it, rows of bores being provided in said trunco-conical part of the flange and in said extension at the region of the latter facing said trunco-conical portion of said flange for connecting said annular gap with the part of the inside of said tubular extension situated below said flange on said push-member, said lower head portion having a row of peripheral bores provided therein for connecting the inside of said tubular extension situated below said flange on the push-member with the space below said lower head portion and, consequently, with the cylindrical chamber in which said valve is arranged.

3. Apparatus as set forth in claim 2, wherein said device responsive to the temperature inside said tubular extension on said top casing comprises a bellows filled with a liquid expansible under the action of heat and surrounding said hollow rod of the push member interposed between said cylindrical member fast with said key and said lower head portion and tightly secured to the flange on said push member and to said lower head, and a helical coil situated inside the tubular extension on the top casing and surrounding said casing, said coil being closed at one end and connected at its other end with the inside of said bellows, said hollow rod having a radial core in its wall at a point near its end closed by the plug for connecting it with the inside of the bellows, a disc-shaped closure being inserted inside said hollow rod immediately below said radial bore to avoid filling said hollow rod with said expansible liquid, said lower head portion having a central tubular projection slipped over the lower part of said hollow rod and telescopically slidable over the latter in order to secure constant alignment between said lower head and said flange on said push member during operation of the apparatus.

References Cited in the file of this patent

UNITED STATES PATENTS

| | | |
|---|---|---|
| 1,373,634 | Powers | Apr. 5, 1921 |
| 1,611,650 | Lawler | Dec. 21, 1926 |
| 2,101,735 | Fonseca | Dec. 7, 1937 |
| 2,708,071 | Burhop | May 10, 1955 |
| 2,828,075 | Panza | Mar. 25, 1958 |
| 2,830,765 | Beller | Apr. 15, 1958 |